United States Patent [19]
Nauroth et al.

[11] Patent Number: 4,495,167
[45] Date of Patent: Jan. 22, 1985

[54] PRECIPITATED SILICAS HAVING HIGH STRUCTURE AND PROCESS FOR THEIR PREPARATION

[75] Inventors: Peter Nauroth, Wesseling; Heinz Esch, Wesseling-Urfeld; Günter Turk, Hanau, all of Fed. Rep. of Germany

[73] Assignee: Degussa Aktiengesellschaft, Frankfurt, Fed. Rep. of Germany

[21] Appl. No.: 438,633

[22] Filed: Nov. 2, 1982

[30] Foreign Application Priority Data

Nov. 7, 1981 [DE] Fed. Rep. of Germany ....... 3144299

[51] Int. Cl.$^3$ .............................................. C01B 33/18
[52] U.S. Cl. ...................................................... 423/339
[58] Field of Search ......................................... 423/339

[56] References Cited

U.S. PATENT DOCUMENTS 4,243,428  1/1981  Donnet et al. ..................... 423/339
4,312,845  1/1982  Wason .............................. 423/339

FOREIGN PATENT DOCUMENTS 14059  3/1956  Fed. Rep. of Germany .

Primary Examiner—Howard S. Williams
Attorney, Agent, or Firm—Cushman, Darby & Cushman

[57] ABSTRACT

There are disclosed precipitated silicas which are characterized by the following physical-chemical data:

|  |  | A | B | C |
|---|---|---|---|---|
| BET-surface area according to DIN 66131 | m$^2$/g | 400–600 | 400–600 | 400–600 |
| DBP-Number | % | 340–380 | 320–360 | 310–360 |
| Bulk density according to DIN 53194 | g/l | 180–220 | 75–120 | 35–70 |
| "ALPINE-Sieve Residue" >63 mµ | Wt. % | 25–60 | <0.1 | <0.01 |

Depending on the particle distribution curve, these precipitated silicas can be employed as silica carriers for active materials of all types, as antiblocking agents for polypropylene and polyethylene films, as thickening silica in specific polar systems in which pyrogenic silicas show little thickening capacity, as highly active matting agents for varnishes and as catalyst carriers as well as insulating materials. The precipitated silicas are produced by establishing a silica final concentration of 46 grams/l in a receiver having water present heated to a temperature of 40°–42° C. while holding the pH constant in the range of 6–7 by simultaneously running in a water glass solution and sulfuric acid while maintaining shearing with an Ekato Turbine over the entire precipitation time, interrupting the precipitation for 90 minutes from the 13th to 103rd minute according to a total precipitation of 146 minutes, aging the suspension of precipitated silica for 12–17 hours, separating the precipitated silica from the suspension with the help of a filter press, washing, liquifying the filter cake with water and/or acid to a suspension having 10–16 weight % solids, finally spray drying and either not grinding or grinding with a cross flow mill or jet mill.

10 Claims, No Drawings

PRECIPITATED SILICAS HAVING HIGH STRUCTURE AND PROCESS FOR THEIR PREPARATION

BACKGROUND OF THE INVENTION

By the structure of a silica is meant its properties which describe the degree and extent of the assembly of its primary particles into secondary particles or to tertiary aggregates. According to the facts available today, which concern the characterization of the structure of furnace blacks, by the use of the Brabender absorption number according to Cabot when applied to precipitated silicas, there can be shown a clear connection between the so-called dibutylphthalate absorption number (DBP number in ml/g or %) and the structure properties (see German Pat. No. 1767332, col. 2, lines 45–64, and related Turk U.S. Pat. No. 4,001,379. The entire disclosure of the Turk U.S. patent is hereby incorporated by reference and relied upon).

As the state of the art, there are known types of silica which in regard to their structure differentiate from the normal silicas (reinforcing materials for rubber) having average structural dimensions.

Thereby, it is a matter of precipitated silicas or silica gels in which products are formed through particular variants of the drying process whose structure is regarded as increased. The aerogels (Ullmanns Enzyklopädie der technischen Chemie, 3rd edition, Vol. 15, page 725 (1949)) which are obtained by supercritical dewatering of silica organo-hydrogels (Kistler U.S. Pat. No. 2,249,767), or by jet mill drying of silica hydrogels (German Pat. No. 1036220) belong to this class. Furthermore, there are included in this group those silicas and silica gels whose intermicellar liquid before the drying step consists of organic solvents or mixtures of such solvents with water (Marshall U.S. Pat. No. 2,285,449, German AS No. 1008717, German Pat. No. 1089736). Also included are spray dried silicas (Netherlands published application No. 65 02791, German Pat. No. 2447613) and finally the precipitated silicas obtained by shearing (German patent application No. F 14059 VI c/12i, German AS No. 1000793, German Pat. No. 1767332, and the related Turk U.S. Pat. No. 4,001,379).

The following compilation (Table 1) contains a comparative summary concerning the state of the art in the comparison to the "normal" precipitated silica with average structure. There are added to the summary additionally the data of three different silicas according to the invention. The comparison of the numbered materials leads to the statement that the invention surprisingly has succeeded in producing highly structured silicas and silica gels with a surface area of more than 400 $m^2/g$ in combination with a DBP number of more than 300 percent.

SUMMARY OF THE INVENTION

The invention starts from the position of producing precipitated silicas having a DBP number of higher than 300 percent and simultaneously a specific surface area of higher than 400 $m^2/g$ by reaction of alkali silicate solution with an acid and/or an acid acting material. A further object of the invention is to produce the precipitated silicas which have the above physical-chemical characteristics in various, defined particle distribution forms.

TABLE 1

| PHYSICAL-CHEMICAL CHARACTERISTICS OF KNOWN SILICAS AND SILICA GELS HAVING HIGH STRUCTURE AND OF SILICAS HAVING NORMAL STRUCTURE IN COMPARISON TO THE SILICAS ACCORDING TO THE INVENTION | | | | | | | | |
|---|---|---|---|---|---|---|---|---|
| Physical-Chemical Characteristic Values: | German AS 14 67 019* Ultrasil VN 3 | German Patent 24 47 613** Sipernat 22 | German Patent 17 67 332 HK 400 | German Patent 10 36 220 Syloid 244 | German Patent 10 36 220 Santocel 62 | Silicas According to the Invention | | |
| | | | | | | Example Nr. 1 | Example Nr. 7 | Example Nr. 9 |
| BET-Surface (DIN 66131) [$m^2/g$] | 170 | 180 | 170 | 330 | 240 | 525 | 520 | 522 |
| DBP-Number [%] | 225 | 275 | 285 | 300 | 300 | 380 | 360 | 357 |
| Bulk Density (DIN 53194) [g/l] | 200 | 230 | 150 | 95 | 40 | 190 | 92 | 45 |
| "ALPINE-Sieve Residue >63 mµ [Wt. %] | 6.0 | >75 | <0.01 | <0.01 | <0.01 | 25 | <0.1 | <0.01 |

*(and related Nauroth U.S. Pat. No. 3,235,331)
**(and related Brandt U.S. Pat. No. 4,094,771)

The subject matter of the invention is precipitated silicas which are characterized by the following physical-chemical material data:

| | | A | B | C |
|---|---|---|---|---|
| BET-surface area according to DIN 66131 | $m^2/g$ | 400–600 | 400–600 | 400–600 |
| DBP-Number | % | 340–380 | 320–360 | 310–360 |
| Bulk density according to DIN 53194 | g/l | 180–220 | 75–120 | 35–70 |
| "ALPINE-Sieve Residue" >63 mµ | Wt. % | 25–60 | <0.1 | <0.01 |

The physical-chemical material parameters of these precipitated silicas of this invention differ, therefore, from those of the highly structured precipitated silicas and silica gels or aerogels by higher BET surface areas in combination with higher DBP numbers. Depending on the particle distribution curve, these novel precipitated silicas are valuable industrially useful, highly effective carrier silicas for active material of all types, antiblocking agents which are capable of conductance for polypropylene and polyethylene films having very good transparency, thickening silicas in specific polar systems in which pyrogenic silicas show little thickening capacity, highly active matting agents for varnishes, and are useful as catalyst carriers, as well as insulating materials.

A further subject matter of the invention is a process for the production of the precipitated silicas according to the invention having the following summarized physical-chemical data:

|  |  | A | B | C |
|---|---|---|---|---|
| BET-surface area according to DIN 66131 | m$^2$/g | 400–600 | 400–600 | 400–600 |
| DBP-Number | % | 340–380 | 320–360 | 310–360 |
| Bulk density according to DIN 53194 | g/l | 180–220 | 75–120 | 35–75 |
| "ALPINE-Sieve Residue" >63 mµ | Wt. % | 25–60 | <0.1 | <0.01 | which is characterized by establishing a silica final concentration of 46 grams/l in a receiver having water present and heated to a temperature of 40°–42° C. while holding the pH constant in the range of 6–7 by simultaneously running in a water glass solution and sulfuric acid while maintaining shearing with an Ekato Turbine over the entire precipitation time, interrupting the precipitation for 90 minutes from the 13th to 103rd minute with a total precipitation time of 146 minutes, aging the suspension of precipitated silica for 12–17 hours, separating the precipitated silica from the suspension with the help of a filter press, washing, liquifying the filter cake with water and/or acid to a suspension having 10–16 weight % solids, and finally spray drying.

The thus obtained precipitated silica has the physical chemical characteristics of type A in the immediately preceding summary. This precipitated silica can be ground with a cross flow mill. Then it has the physical chemical characteristics of type B in the immediately preceding summary. If the precipitated silica of type A, however, is ground by means of a jet mill, then it has the physical-chemical characteristics of type C in the immediately preceding summary.

The particular advantages of the process according to the invention for the production of the precipitated silicas of the invention, which have a favorable effect on the industrial efficiency of the new process are the following:

The high solids content in the filter cake of 16–17 percent in comparison to precipitated silicas having high specific areas reduces the drying costs, and therewith the energy requirements of the process of production.

The surprisingly low washing times which previously has not been observed with precipitated silicas of high surface area, reduces the requirement for wash water, and permits a considerable increase of the filter press capacity.

Unless otherwise indicated, all parts and percentages are by weight.

The process can comprise, consist essentially of, or consist of the stated steps with the recited materials.

The silicas of the invention as well as the process for their production are explained and described in connection with the following examples.

DETAILED DESCRIPTION

Example 1

There were present in a 75 m$^3$ wooden tank which serves as precipitation container and is equipped with a MIG paddle stirrer and an Ekato turbine shearer 60 m$^3$ of water having a temperature of 40° C. There were simultaneously flowed into this tank at a speed of 9.8 m$^3$/h commercial water glass (SiO$_2$. 26.8 Wt. % Na$_2$O:8.0 Wt. %, module=3.35) and concentrated sulfuric acid (96%) at a speed of 0.98 m$^3$/h. Thereby, the acid was added via the turbine which was set into operation with the beginning of the precipitation. During this addition, the pH of the material in the precipitation container was held at 6.0 after the 13th minute of precipitation, i.e., at the marked-off increase in viscosity, the addition of waterglass and acid was interrupted for 90 minutes. During this interruption phase, shearing was continued with the Ekato turbine. After the 103rd minute, the addition of waterglass (and sulfuric acid) was continued while maintaining the above-mentioned speeds of addition and the pH until the 146th minute. Then the solids content of the precipitated suspension was 46 g/l. The temperature can have a value of 42°–49° C., depending on the outside temperature conditions. The final pH is 6.0. Altogether, there were added 9.1 m$^3$ of waterglass and 0.91 m$^3$ of sulfuric acid. The suspension was aged for 15 hours in an intermediate container before being separated by pressing. In connection with this aging phase, the suspension was filtered by means of 4 filter presses. Thereby, the full time at a final pressure of 3.3 bar was 1 hour. After a very short washing time of only 1.5 hours, there were established for the filtrate flowing off a conductivity value of 1050 µS, after 4 hours washing time, one of 280 µS. The solids content of the filter cake obtained was at 16.5–17 weight %. It was fluidized with water under the action of shearing forces and then showed a solids content of 11 weight %. In connection with the fluidization, the silica suspension was dispersed by means of a rotating disc and dried with hot combustion gases.

The characteristics of the unground product are found in Table 2.

Example 2

A precipitated silica was produced according to Example 1. Thereby, the aging time was deviated from Example 1 by being increased to a total time of 16 hours, which at the same coefficient of measure of structure led to a reduced BET surface area.

The characteristics of the unground silica are found in Table 2.

Example 3

The production of precipitated silica took place according to Example 1. Deviating therefrom, the aging time was reduced to 13 hours and simultaneously the solids content increased from 11 to 13 weight %.

The characteristics of the unground silica can be seen from Table 2.

Example 4

There were kept the conditions of Example 1. Merely, there was increased to 12 percent the solids content of the dispersed filter cake sent to the spray drying.

The characteristics of the unground silica are found in Table 2.

Example 5

The production of this silica took place according to Example 1. Only the aging time was changing from 15 to 17 hours. Furthermore, the filter cake was dispersed with a little dilute sulfuric acid and a little water and the resulting suspension having a solids content of 16 weight % was spray dried. The free acid contained in the solids was neutralized with ammonia gas.

The characteristics of the unground silica are found in Table 2.

Example 6

The unground, spray dried silica of Example 5 was ground on an ALPINE cross flow mill Type UP 630. There resulted a product whose physical-chemical data are set forth in Table 2.

Example 7

The spray dried precipitated silica obtained according to Example 1 was ground by means of an ALPINE cross flow mill of Type UP 630. The data of this silica are found in Table 2.

Example 8

The unground, spray dried precipitated silica obtained according to Example 3 was ground by means of an ALPINE cross flow mill of Type UP 630. The characteristics of this silica are set forth in Table 2.

Example 9

The silica of Example 1 was ground by means of an air jet mill of Type Microgrinding MC 500, thereby there was obtained an output of 100 kg/h at a grinding air pressure of 7 bar. The characteristics of this silica likewise are set forth in Table 2.

Example 10

The precipitated silica according to Example was air jet ground according to the conditions of Example 9. There resulted the data which are contained in Table 2.

Example 11 (Comparison Example)

This example shows the superiority of the silicas of the invention in comparison to known high surface area silicas based on improved filtration and washing speed on filter presses.

There was produced a precipitated silica having a specific surface area of 670 $m^2/g$ according to German AS No. 1517900 (columns 2-3, lines 53-68 and 1-7).

The data of the filtration process are shown in Table 3.

In Table 3, there are compared this filtration data with the filtration data of the silica of the present invention according to Example 3. This shows nearly the same conductivity which was determined on the dried precipitated silica.

The comparison example shows the surprisingly high saving of wash water and filter press capacity. The process of the invention, therefore, permits the production of precipitated silicas having high surface areas under extremely economical conditions.

The physical-chemical material data such as specific BET surface area, DBP number, and bulk density were determined according to DIN (German Industrial Standard) methods.

The conductivity in 4 percent aqueous dispersion was determined according to German OS No. 2628975, page 16.

The "'ALPINE' sieve residue" was ascertained as follows:

For the determination of the sieve residue, the silica was screened through a 500μ sieve in order to destroy any deaeration modules which might be present. Then 10 grams of the sieved material was placed on a fixed air jet screen and sieved at 200 mm water column-vacuum. The sieving is finished when the residue remains constant, which in most cases is recognized by the fluid appearance. For safety, sieving is continued for one more minute. Generally, the sieving process lasts for 5 minutes. In case agglomerates form, the sieving process is interrupted briefly and the agglomerates destroyed with a brush under light pressure. After the sieving, the sieve residue is carefully knocked off of the air jet sieve and recovered.

The entire disclosure of German priority application No. P 3144299.4 is hereby incorporated by reference.

TABLE 2

PHYSICAL-CHEMICAL CHARACTERISTICS OF THE PRECIPITATED SILICAS PRODUCED ACCORDING TO EXAMPLES 1-10

| Physical-Chemical Characteristics: | 1* | 2* | 3* | 4* | 5* | 6** | 7** | 8** | 9*** | 10*** |
|---|---|---|---|---|---|---|---|---|---|---|
| BET-surface area DIN 66131 [$m^2/g$] | 525 | 460 | 595 | 525 | 418 | 411 | 520 | 590 | 522 | 415 |
| DBP-Number DIN 53601 [%] | 380 | 378 | 362 | 372 | 346 | 331 | 360 | 355 | 357 | 322 |
| Bulk Density DIN 53194 [g/l] | 190 | 190 | 196 | 200 | 203 | 100 | 92 | 94 | 45 | 52 |
| "ALPINE-Sieve Residue >63 mμ [Wt. - %] | 25 | 26 | 60 | 56 | 54 | <0.1 | <0.1 | <0.1 | <0.01 | <0.01 |

*Unground silica
**ALPINE-cross flow mill - ground silica
***Air jet mill - ground silica

TABLE 3

FILTRATION AND WASHING PROCESS OF HIGH SURFACE AREA SILICAS ACCORDING TO GERMAN AS 15 17 900 AND SILICA ACCORDING TO THE PRESENT INVENTION

| Parameter: | Precipitated Silica According to German AS 15 17 900 | Precipitated Silica According to the Invention, Example 3 |
|---|---|---|
| Specific Surface Area m²/g | 670 | 595 |
| Filling Time of the Filter Presses Hours | 3 | 1.5 |
| Washing Time Hours | 36 | 1.5 |
| Filter Cake-Solids Content Wt. % | 16 | 16.5 |
| Conductivity of the Dry Sillica μS (in 4% Aqueous Phase) | about 800 | about 1000 |

What is claimed is:

1. A precipitated silica which is one having the following physical-chemical characteristics:

| (1) | BET-surface area | m²/g | 400–600 |
|---|---|---|---|
| | DBP-number | % | 340–380 |
| | Bulk density | g/l | 180–220 |
| | Sieve residue >63 mμ | Wt. % | 25–60, or |
| (2) | BET-surface area | m²/g | 400–600 |
| | DBP-number | % | 320–360 |
| | Bulk density | g/l | 75–120 |
| | Sieve residue >63 mμ | Wt. % | <0.1, or |
| (3) | BET-surface area | m²/g | 400–600 |
| | DBP-number | % | 310–360 |
| | Bulk density | g/l | 35–70 |
| | Sieve residue >63 mμ | Wt. % | <0.01. |

2. A precipitated silica according to claim 1 having the following physical-chemical characteristics:

| BET-surface area | m²/g | 400–600 |
|---|---|---|
| DBP-number | % | 340–380 |
| Bulk density | g/l | 180–220 |
| Sieve residue >63 mμ | Wt. - % | 25–60 |

3. A precipitated silica according to claim 2 having a BET surface area of 418 to 595 m²/g, a DBP number of 346 to 380%, a bulk density of 190 to 203 g/l, and a sieve residue >63 mμ of 25 to 60 weight %.

4. A process for the production of precipitated silica according to claim 3 comprising establishing a silica final concentration of about 46 g/l by providing water in a container at a temperature of 40°–42° C., holding the pH constant in the range of 6–7, simultaneously running in a waterglass solution and sulfuric acid while maintaining shearing during the entire precipitation time, interrupting the precipitation for 90 minutes from the 13th to 103rd minute of a total precipitation time of 146 minutes, to form said silica final concentration, aging the suspension of precipitated silica for 12–17 hours, separating the precipitated silica from the suspension with the aid of a filter press, washing, liquifying the filter cake with water, acid, or a mixture of water and acid to form a suspension having 10–16 weight % solids and finally spray drying.

5. A precipitated silica according to claim 1 having the following physical-chemical characteristics:

| BET-surface area | m²/g | 400–600 |
|---|---|---|
| DBP-number | % | 320–360 |
| Bulk density | g/l | 75–120 |
| Sieve residue >63 mμ | Wt. - % | <0.1 |

6. A precipitated silica according to claim 5 having a BET surface of 411 to 590 m²/g, a DBP number of 331 to 360%, a bulk density of 92 to 100 g/l, and a sieve residue >63 mμ of <0.1 weight %.

7. A process for the production of the precipitated silica of claim 5 comprising grinding in a cross flow mill a dry precipitated silica which had been prepared by a process comprising establishing a silica final concentration of about 46 g/l by providing water in a container at a temperature of 40°–42° C., holding the pH constant in the range of 6–7, simultaneously running in a waterglass solution and sulfuric acid while maintaining shearing during the entire precipitation time, interrupting the precipitation for 90 minutes from the 13th to 103rd minute of a total precipitation time of 146 minutes, to form said silica final concentration, aging the suspension of precipitated silica for 12–17 hours, separating the precipitated silica from the suspension with the aid of a filter press, washing, liquifying the filter cake with water, acid, or a mixture of water and acid to form a suspension having 10–16 weight % solids and finally spray drying.

8. A precipitated silica according to claim 1 having the following physical-chemical characteristics:

| BET-surface area | m²/g | 400–600 |
|---|---|---|
| DBP-number | % | 310–360 |
| Bulk Density | g/l | 35–70 |
| Sieve residue >63 mμ | Wt. - % | <0.01 |

9. A precipitated silica according to claim 8 having a BET surface area of 415 to 522 m²/g, a DBP number of 322 to 357%, a bulk density of 45 to 52 g/l, and a sieve residue >63 mμ of <0.0. weight %.

10. A process for the production of the precipitated silica of claim 8 comprising grinding in a jet mill a precipitated silica which had been prepared by a process comprising establishing a silica final concentration of about 46 g/l by providing water in a container at a temperature of 40°–42° C., holding the pH constant in the range of 6–7, simultaneously running in a waterglass solution and sulfuric acid while maintaining shearing during the entire precipitation time, interrupting the precipitation for 90 minutes from the 13th to 103rd minute of a total precipitation time of 146 minutes, to form said silica final concentration, aging the suspension of precipitated silica for 12–17 hours, separating the precipitated silica from the suspension with the aid of a filter press, washing, liquifying the filter cake with water, acid, or a mixture of water and acid to form a suspension having 10–16 weight % solids and finally spray drying.

* * * * *